Aug. 27, 1940.  R. P. BREESE  2,212,913
VALVE
Filed Aug. 19, 1937   8 Sheets-Sheet 1
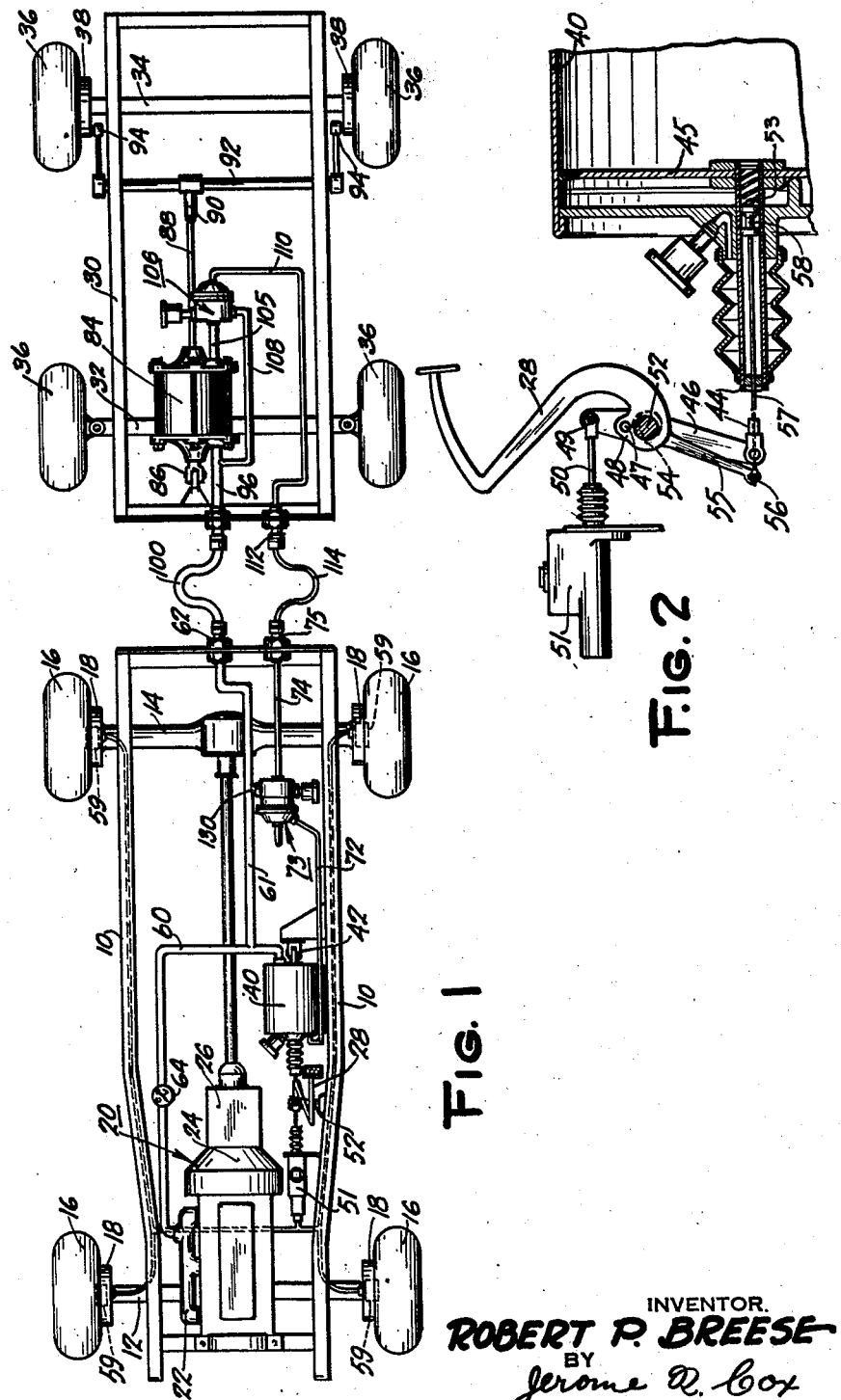
INVENTOR.
ROBERT P. BREESE
BY
Jerome D. Cox
ATTORNEY.

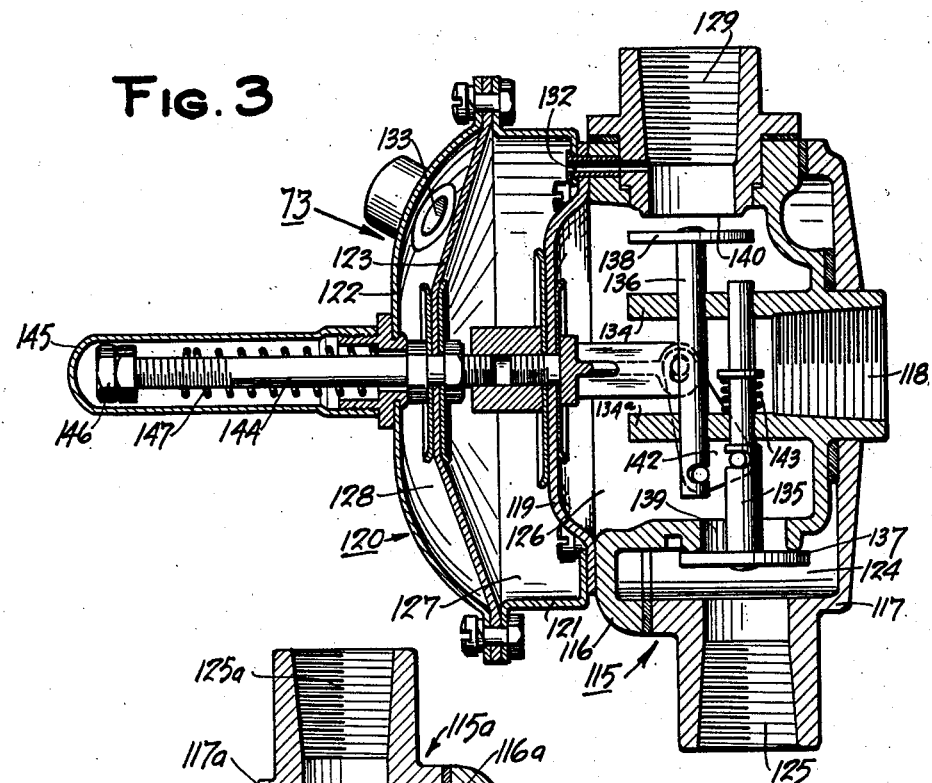
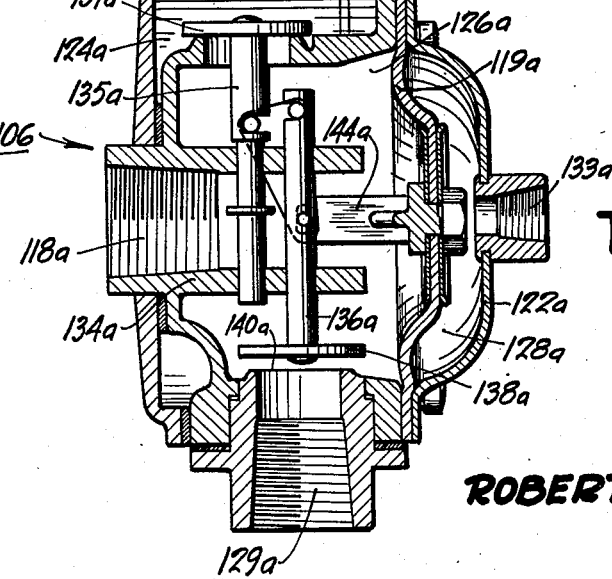

Aug. 27, 1940.   R. P. BREESE   2,212,913
VALVE
Filed Aug. 19, 1937   8 Sheets-Sheet 3
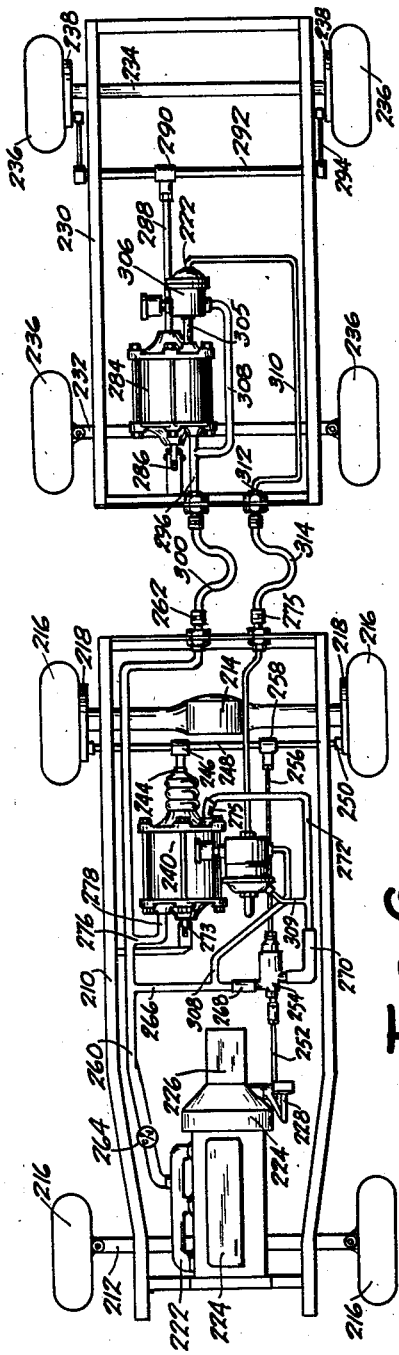
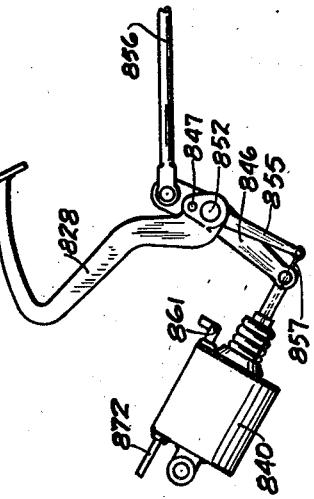
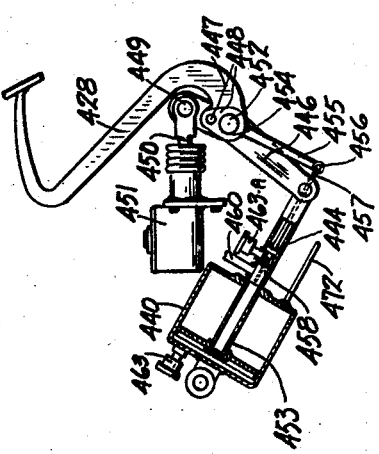
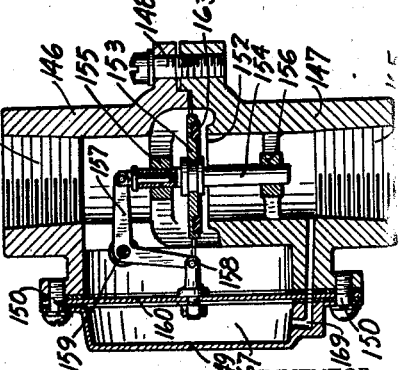
INVENTOR.
ROBERT P. BREESE
BY Jerome R. Cox
ATTORNEY.

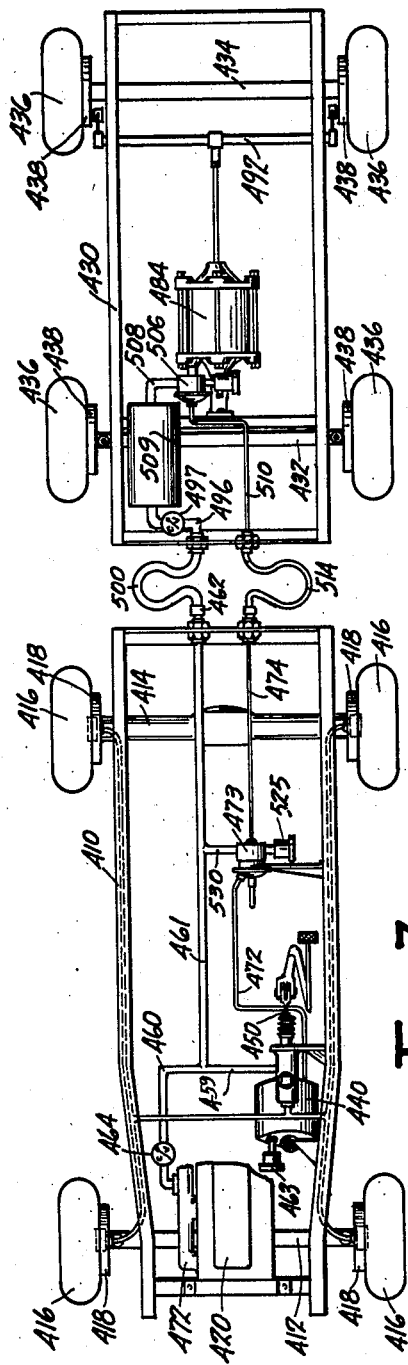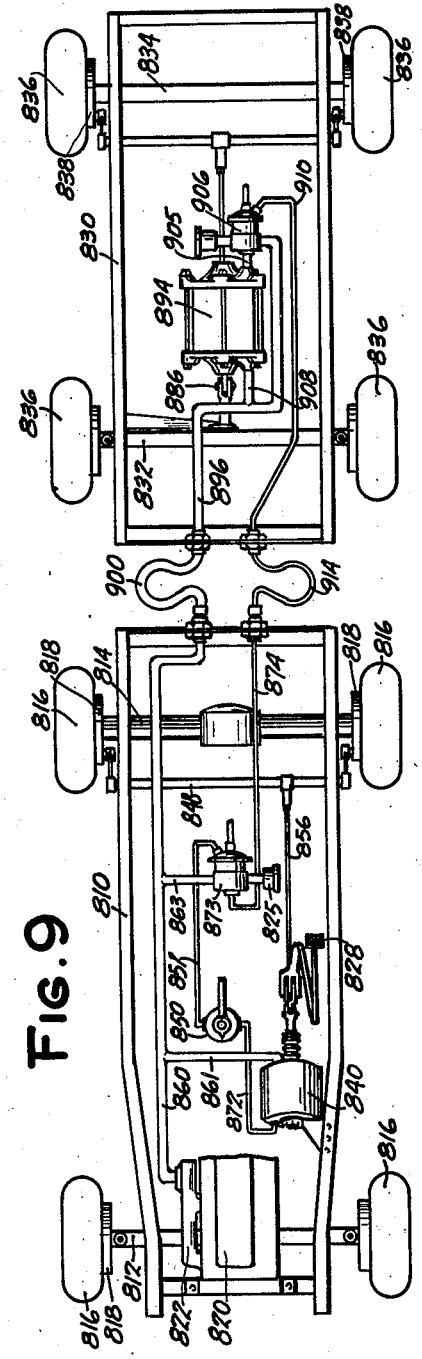

Aug. 27, 1940.   R. P. BREESE   2,212,913
VALVE
Filed Aug. 19, 1937   8 Sheets-Sheet 5

INVENTOR.
ROBERT P. BREESE
BY Jerome D Cox
ATTORNEY.

Aug. 27, 1940. R. P. BREESE 2,212,913
VALVE
Filed Aug. 19, 1937 8 Sheets-Sheet 6
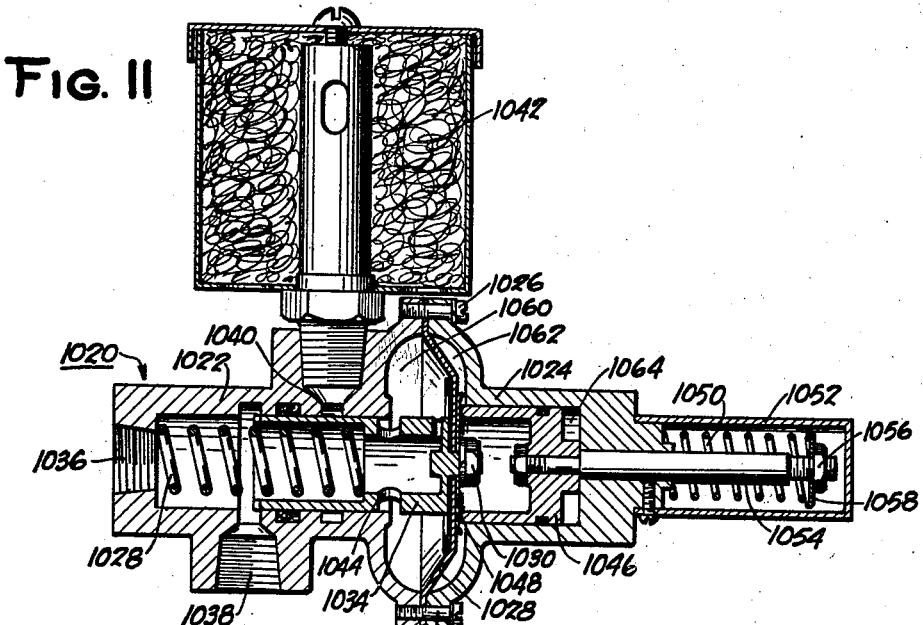
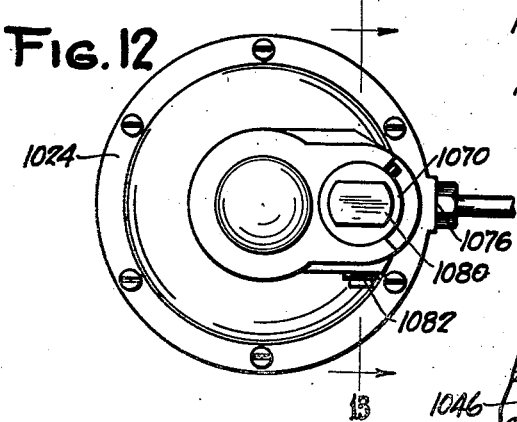
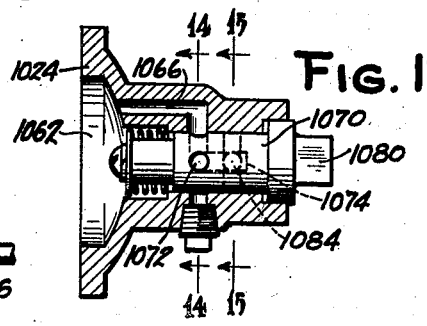
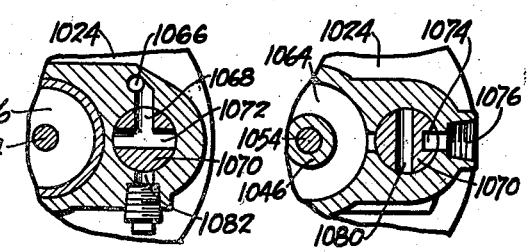
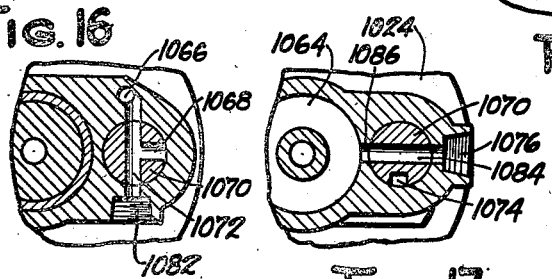
INVENTOR.
ROBERT P. BREESE
BY
Jerome R. Cox
ATTORNEY.

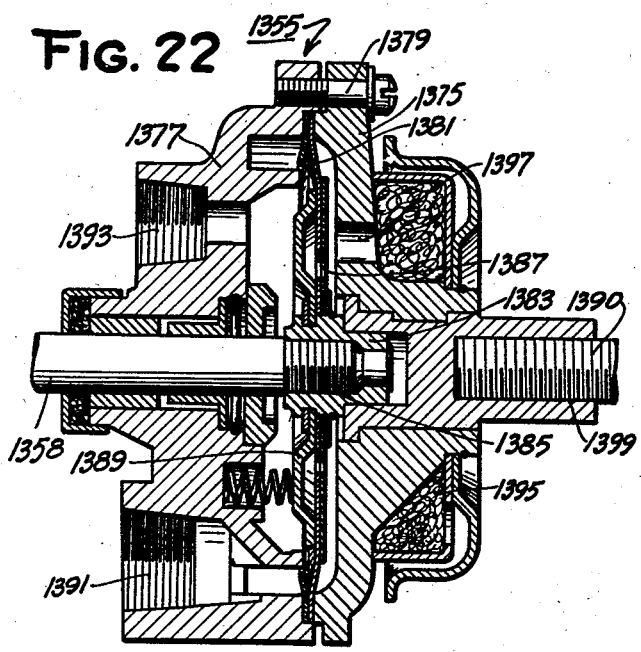
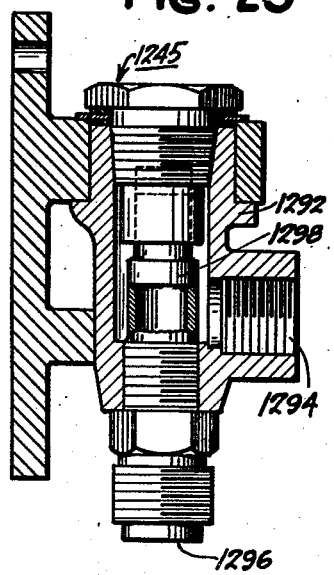
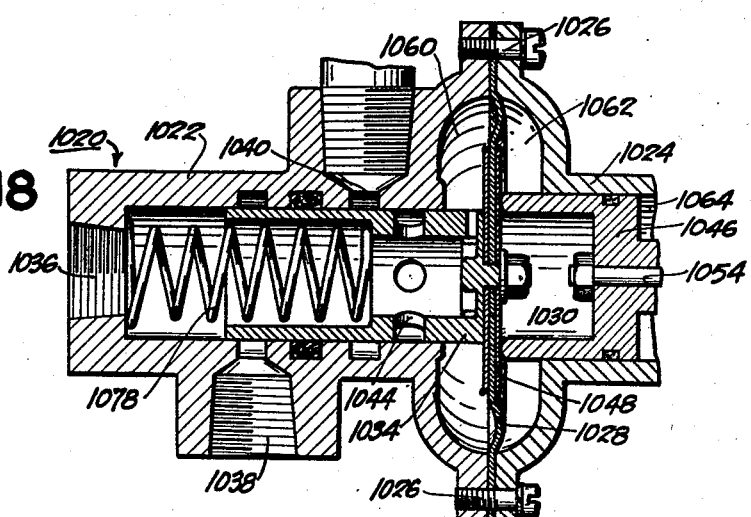

Aug. 27, 1940.  R. P. BREESE  2,212,913
VALVE
Filed Aug. 19, 1937   8 Sheets-Sheet 8
FIG. 19
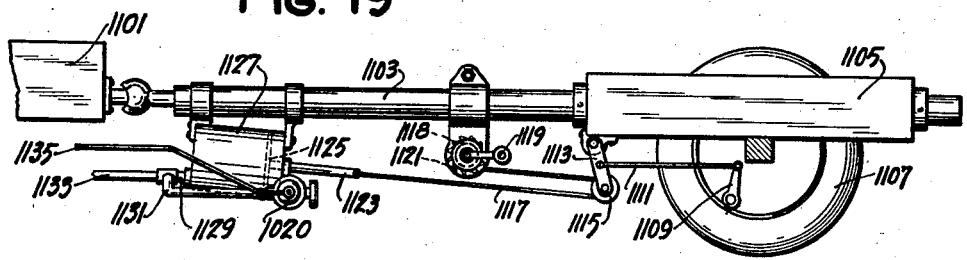
FIG. 20
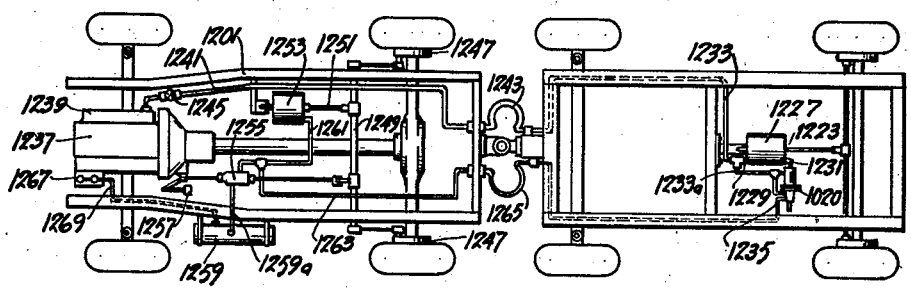
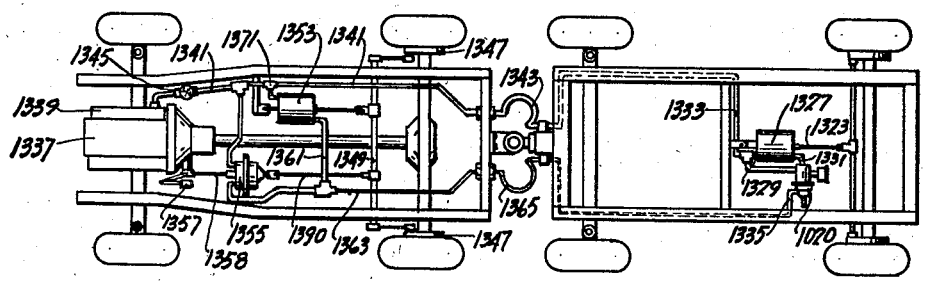
FIG. 21
INVENTOR.
ROBERT P. BREESE
BY
Jerome R. Cox
ATTORNEY.

Patented Aug. 27, 1940

2,212,913

UNITED STATES PATENT OFFICE 2,212,913

VALVE

Robert P. Breese, New York, N. Y., assignor to Bendix Products Corporation, South Bend, Ind., a corporation of Indiana Application August 19, 1937, Serial No. 159,841

28 Claims. (Cl. 188—3)

This invention relates to brakes and especially to brakes which are operated by power. In the illustration thereof, I have shown several arrangements of power brakes in which brakes for a trailer are operated by power developed by means of differential air pressures. The differential pressures may be obtained by utilizing the vacuum which is always available in adequate quantities because of the suction of the intake manifold of the internal combustion engine by which the automotive vehicle is operated.

In the transportation of freight of all kinds by automotive vehicles, it is the present practice oftentimes to use a tractor vehicle for supplying the power and a trailer vehicle for carrying the load. Both of these vehicles are preferably provided with brakes operated by power. It is preferable also to provide some arrangement whereby there is a reaction on the operating member (brake pedal) so that the driver can "feel" the braking force being provided. It is almost necessary also to be assured that the braking applied to the trailer is at least equal in force to that applied to the tractor.

The most practical method of providing reaction or "feel" for the driver is to distribute the brake applying load so that part is accomplished by power and part by the physical effort of the driver exerted on the pedal. Also obviously this reaction can most practically be associated only with the tractor brakes. It is apparent therefore that the tractor brakes being applied partially by physical force and partially by power, they will tend to be applied more strongly than the trailer brakes. This would naturally result in a greater deceleration of the tractor than of the trailer with a likelihood that the trailer would skid up on the tractor and "jackknife." The prevention of such accidents is one of the problems which I have solved by this invention.

As developed above, it is highly desirable that the braking on the trailer be at least as great as the braking on the tractor in order to prevent skidding, "jack-knifing" and similar accidents and to develop maximum braking. This could be accomplished by using a larger power cylinder on the trailer and at first thought that seems to be the obvious solution of the problem. However, not only is such an arrangement objectionable from the standpoint of cost and the standpoint of difficulty in finding space for the large cylinders which would be necessary on the trailer, but such a practice has other more forbidding aspects. If a larger cylinder is used so as to properly proportion the braking at lower ranges, the braking builds up on the trailer so high during the higher ranges that the trailer wheels skid before the tractor brakes have developed maximum braking. Thus especially because of the fast growing use of reactionary power braking hookup, it becomes more important to find another suitable means to speed up the action of the trailer vacuum power cylinder so as to compensate for the physical effort affecting the tractor brakes before full power operation is obtained.

Furthermore, other problems arise in providing brakes for use with a tractor vehicle supplying power and a trailer vehicle carrying the load. Frequently a tractor is equipped with mechanical brakes of the servo type and a trailer is equipped with brakes of the non-servo type. In such instances also it has been found very difficult to properly synchronize the braking of these units.

Another problem arises in connection with the present practice of using a tractor vehicle for supplying the power and a trailer vehicle for carrying the load. Upon arrival at the destination the tractor is often uncoupled from the trailer and the trailer left for unloading and reloading while the tractor is coupled with another trailer and immediately again goes out on the road. A great many of the tractor vehicles are equipped with power brakes of the vacuum power type while many other of the tractor vehicles are equipped with power brakes of the compressed air type. Substantially all of the trailer vehicles are equipped with power brakes of the vacuum power type. Moreover, most of the trailer vehicles have brakes of the vacuum suspended type, that is to say, they are provided with a vacuum power system having a cylinder in which there is a piston and in which the interior of the cylinder on both sides of the piston is normally evacuated so that there exists on each side of the piston a vacuum. Therefore, whenever atmospheric air is allowed to enter the rear of the cylinder no matter whether that atmospheric air enters on account of the operation of the brake control by the operator, or by reason of accidental or intentional uncoupling of the trailer from the tractor, the brake on the trailer is thereby set to hold the trailer against undesired motion and to stop the trailer.

The difficulty has often been encountered that trailer vehicles fitted for coupling with tractors having vacuum power brakes cannot be readily coupled for operation to tractor vehicles having superatmospheric air pressure brakes and conversely trailer vehicles fitted for operation with tractors having such superatmospheric air brakes cannot be readily coupled to tractors having vacuum brakes. Therefore, often it was impossible to utilize a tractor truck for the transportation of an available loaded trailer.

Broadly the invention comprehends a duplex braking system for a tractor and a trailer (each including either a mechanically or hydraulically actuated braking system and a pneumatic power braking system) coupled one to the other and operative concomitantly or independently to more effectively actuate the brakes associated with the wheels of the respective units.

*Objects*

One object of the invention therefore is to provide means for synchronizing the braking systems of a tractor and a trailer.

Another object of the invention is to provide vacuum operated means for actuating two independent braking systems including a vacuum power cylinder for each system and means for speeding up the action of the power cylinder for one of the systems.

A further object is the prevention of jack-knifing and similar accidents.

A further object is the efficient combination of a power operated trailer brake with a power operated reactionary tractor brake system.

Another of the objects of the invention is to provide arrangements and means whereby trailers may be readily coupled to and have the trailer brakes operated from, tractors having brakes of either of several types.

A further object of the invention is the provision of a valve, designated as a relay, capable of controlling the brakes of the trailer vehicle quickly and efficiently and proportioning the power used for applying the brakes of the trailer vehicle in accordance with the power being used on the tractor vehicle.

A further object of the invention is to provide such a relay valve in combination with means on the tractor vehicle for controlling accurately the power applied to the brakes both of the tractor and the trailer vehicle by means of the pressure exerted by the operator.

A further object of the invention is the provision of such a relay valve for the trailer vehicle so arranged that it may be converted readily so as to be controlled as desired by a tractor truck having vacuum power brakes or a tractor truck having superatmospheric air pressure brakes.

A further object of the invention is the provision of an arrangement on a trailer vehicle for trailers of the long pole extension type that will give a uniform brake action no matter how far the pole or chassis of the trailer is extended.

An important feature of the invention is the construction of the synchronizer valve itself which is designed to meet the varying conditions that are found in the tractor and trailer field.

Accordingly, one of the features of this invention is a synchronizer valve for unbalancing the power application, and means for regulating the valve to suit various conditions.

Other features of the invention include a relay valve provided with a diaphragm whereby the amount of braking force is controlled, provided with separate chambers to which superatmospheric air pressure and vacuum may be conducted and provided with a control for the inlets to said chambers whereby said superatmospheric air pressure or vacuum may be conducted thereto as desired.

Further features of the invention include the provision of a follow-up control valve so arranged that the pressure exerted on the brakes is proportional to the pressure being exerted by the operator; the provision of a check valve for maintaining a uniform vacuum in the lines and cylinders regardless of variations in vacuum in the intake manifold; the provision of means for synchronizing the power developed by the vacuum cylinder used on the trailer to correspond with the power developed for the brakes of the tractor; and means for lengthening or shortening the connection between the power cylinder and the brakes in order to compensate for extensions or contractions of the telescoping connection of long pole extension trailers.

Other objects and features of the invention will become apparent from the ensuing description of the several embodiments of the invention, and in the course of this description reference is to be had to the following drawings, in which:

*General description of drawings*

Figure 1 is a diagrammatical illustration of a motor vehicle of the heavy duty type and a trailer illustrating the use of the synchronizer valve of the invention in connection with a reactionary hookup and internal valve power cylinder for applying hydraulically actuated brakes on the tractor;

Figure 2 is a fragmentary view partially in section and partially in elevation showing the reactionary hookup of Figure 1;

Figure 3 is a sectional view of the synchronizer valve;

Figure 4 is a sectional view of the relay valve;

Figure 5 is a sectional view of the pressure actuated check valve;

Figure 6 is a diagrammatical illustration of a tractor and a trailer illustrating the use of a synchronizer valve in connection with an external valve hookup for applying mechanically actuated brakes on the tractor;

Figure 7 is a diagrammatical illustration of a typical installation of a vacuum power system similar to that shown in Figure 1 and embodying the invention but differing from Figure 1 in the use of a pusher type power cylinder;

Figure 8:
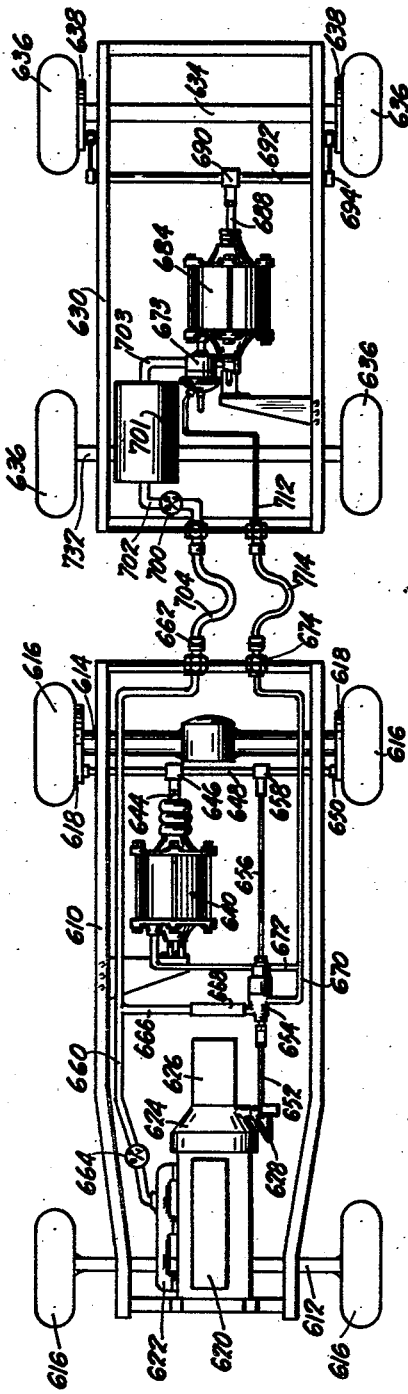
Figure 10:
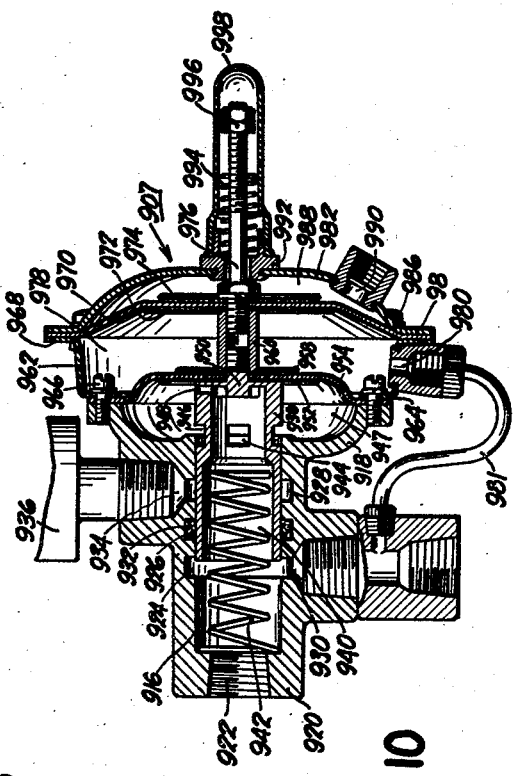

Figure 7ª is a fragmentary view partially in section and partially in elevation showing the reactionary hookup of Figure 7;

Figure 8 is a diagrammatical illustration of a tractor and trailer combination illustrating the invention, in which combination the tractor brakes are controlled by an external valve and actuated mechanically and in which the synchronizer valve is positioned on the trailer;

Figure 9 is a diagrammatical illustration of a tractor and trailer combination in which the tractor brakes are actuated by power through a mechanical linkage, the power reacting through linkage on the pedal, and in which a synchronizer valve is provided on both the tractor and the trailer;

Figure 9ª is a fragmentary view partially in section and partially in elevation showing the reactionary hookup of Figure 9;

Figure 10 is a sectional view similar to Figure 3 showing a modified form of synchronizer valve;

Figure 11 is a view in section of a relay valve constructed according to my invention so as to synchronize trailer brakes to tractor brakes operated either by superatmospheric air or vacuum and showing the valve in the position it would occupy with the brakes released;

Figure 12 is a view in end elevation of the valve shown in Figure 11 as the valve would appear looking at it as from the right in Figure 11 with the air cleaner removed;

Figure 13 is a view in section taken substantially on the line 13—13 of Figure 12;

Figure 14 is a view in section taken substantially on the line 14—14 of Figure 13;

Figure 15 is a fragmentary view in section taken substantially on the line 15—15 of Figure 13;

Figure 16 is a fragmentary view in section similar to Figure 14 but showing the auxiliary control valve of the relay unit rotated clockwise ninety degrees from the position shown in Figure 14;

Figure 17 is a view in section similar to Figure 15 but showing the auxiliary control valve rotated clockwise ninety degrees from the position shown in Figure 15;

Figure 18 is a fragmentary view in section corresponding to the showing of Figure 11 but having parts broken away and having the valve shown in the position which the parts occupy when the brake is being held applied;

Figure 19 is a fragmentary view showing a long pole extension type of trailer equipped with a vacuum power brake controlled by a valve such as that shown in Figure 11;

Figure 20 is a diagrammatic view showing a tractor and trailer arrangement in which the tractor is equipped with power brakes of the compressed air type, the trailer is equipped with power brakes of the vacuum suspended vacuum type and the brakes of the two vehicles are synchronized and controlled by means of a valve of the type shown in Figure 11;

Figure 21 is a view similar to Figure 20 showing a combination in which the tractor vehicle is equipped with vacuum power brakes of the vacuum suspended type while the trailer vehicle is (like the trailer vehicle of Figure 20) also equipped with power brakes of the vacuum suspended type controlled by a valve like that shown in Figure 11;

Figure 22 is a view in section of the pedal operated control valve of Figure 21; and Figure 23 is a view in section through the check valve of Figure 21.

Detailed description

Referring to the drawings for more specific details of the invention, Figure 1 shows a tractor-trailer arrangement employing a reactionary brake hookup on the tractor and utilizing my synchronizer valve for the trailer brakes. Therein 10 represents the frame of a motor vehicle chassis of the heavy duty type, such as a tractor. The frame is supported by conventional springs, not shown, mounted on a front axle 12 and a rear axle 14. Wheels 16 of any preferred type are mounted on the axles 12 and 14, and brakes 18 are associated with the wheels 16.

A power plant comprising an internal combustion engine 20 suitably supported on the frame 10 has an intake manifold 22 and all other essentials, not shown, for the proper operation thereof. The engine has associated therewith a clutch 24 and a transmission 26 adapted to be connected as in general practice to the differential gear on the rear axle 14. Suitably mounted on the frame 10 is a foot pedal lever 28 for actuating a braking system.

The tractor has associated therewith a trailer including a frame 30 supported as by springs, not shown, mounted on a front axle 32 and a rear axle 34. Wheels 36 of a preferred type are mounted on the axles 32 and 34, and brakes 38 are associated with the wheels mounted on the rear axle.

The structure thus far described is that of a conventional tractor and trailer. Commercial vehicles of this type are usually equipped with braking systems for both the tractor and the trailer, and such braking systems vary according to the election of the manufacturer. The effectiveness of the motor vehicle braking system may be greatly enhanced if such system be combined with a vacuum power system of the type wherein power is derived from the engine of the vehicle.

Reactionary power brake hookup

In the embodiment of the invention illustrated in Figure 1, a vacuum power cylinder 40 has one head pivotally attached to the frame 10 as at 42. This head is designated in this description as the rear head and the opposite end as the forward end because of the position on the vehicle. It is customary in field practice to always call the piston rod end the rear end but it is believed it will be less confusing to designate the ends of the cylinders to correspond to the position of the cylinder on the vehicle. Accordingly, that practice is followed throughout this specification. The rod 44 of a piston 45 reciprocable in the cylinder 40 extends through the forward head of the cylinder and is pivotally connected to a floating power lever 46 pivoted as at 47 on an extension 48 of the pedal lever 28. The upper end of the lever 46 is pivotally connected as at 49 to a piston rod 50 of a master cylinder 51.

The pedal lever 28 is pivoted on a shaft 52 secured to the frame 10. The lever 46, however, is formed with an oversized hole 54 so that it is loose upon the shaft 52. A lower extension 55 of the pedal lever 28 is connected as at 56 to a valve rod 57 connected to operate an internal valve 58 associated with the cylinder 40. The linkage is so arranged that when force is applied to the foot pedal lever 28 the valve 58 is moved to its application position so that a vacuum passage connecting opposite ends of the cylinder 40 is closed and a passage to the atmosphere for the front end of the cylinder 40 is opened. When the valve is in this application position, if the power piston should not be operated, the loose fit of the over-sized hole 54 would be taken up so that the lever 28—48—55, and the lever 46 would act as a unit and so that the force applied to the foot pedal lever 28 would be transmitted therefrom through the extension 48, the pivot 47 and the lever 46 to the piston rod 50 and the master cylinder 51. Pressure would then be transmitted to the brake cylinders to operate the brakes 18, to the end that the brakes would be manually actuated.

A pipe 60 connected to the intake manifold 22 of the engine is connected to the rear end of the cylinder 40 to maintain a vacuum in that end of the cylinder at all times. It is connected by a branch pipe 61 to a suitable coupling and cut-off valve indicated at 62. The pipe 60 has connected therein a check valve 64 preferably arranged adjacent the connection of the pipe 60 to the intake manifold 22. The purpose of the check valve is to maintain the maximum vacuum in the power cylinder during any cycle of operation.

Hookup operation

From the above it will be understood that prior to brake application both sides of the cylinder 40 are connected to vacuum. The pressure of the liquid in the master cylinder 51 reacting on the power lever 46 moves the piston 45 to the forward position as shown. When pressure is exerted on the pedal lever 28, it first moves the valve 58 to cut off the vacuum connection from the front of the power cylinder (a lapped position) and then moves it to allow the entrance of air under atmosphere pressure to said front of the cylinder. This differential of pressures exerts force on the piston 45 which acts on the lever 46. This arrangement where the cylinder piston is in the released position suspended in vacuum is sometimes called a vacuum suspended or vacuum balanced cylinder or hookup.

The lever 46 pivoting at 47 transmits this force as a reaction to the pedal lever 28, but because of the leverages involved the pedal "feel" is considerably less than the effort which would be required to operate the master cylinder directly. Moreover, the movement of the piston rod 44 relative to the valve rod 57 moves the valve to a lapped position and it is necessary to "follow-up" with the pedal to increase the braking force exerted. Finally, the force exerted by the moving pedal 28 and the moving piston 45, combine to exert greater pressure on the piston rod 50 than would be exerted by either alone. As suggested above, should the power fail, the brakes could be applied physically by the pedal 28 but greater pedal force would be required. Thus means are provided to apply the brakes of the tractor vehicle by vacuum power acting through a hydraulic transmission system, providing a reaction or "feel" on the pedal and also requiring "follow-up" of the pedal.

Trailer power brakes

Means are also provided to actuate the brakes of the trailer vehicle solely by vacuum power. To the front end of the cylinder 40 there is connected a pipe 72 extending rearwardly to a synchronizer valve 73 to be subsequently described in detail. Suffice to say here that the pressure in the pipe 72 controls the synchronizer valve which in turn controls the pressure in a pipe 74 leading from the synchronizer valve to a coupling and cut-off valve 75. On the trailer a vacuum power cylinder 84 has its forward head pivotally attached to the frame 30 as indicated at 86, and a rod 88 of the piston reciprocable in the cylinder extends through the rear head of the cylinder and is pivotally connected to a lever 90 keyed on a rock shaft 92 suitably mounted on the frame and connected as at 94 to the brakes 38 associated with the rear wheels of the trailer.

The forward head of the cylinder 84 has a port connected as by a pipe 96, and a flexible tube 100 to the coupling 62 on the rear cross bar of the tractor. The rear head of the cylinder 84 has a port connected by a short pipe 105 to a relay valve 106. The valve 106 is connected by a conduit 108 to the pipe 96 and by a pipe 110 to a short pipe section 112 suitably mounted on the front cross bar of the frame 30. The section 112 is connected as by a flexible tube 114 to the coupling 75 on the rear cross bar of the tractor frame.

Synchronizer valve

This synchronizer valve 73 is an important factor in the instant invention. Heretofore it has been found very difficult to properly synchronize the brakes of tractor and trailer units. With the introduction of the reactionary power brake hookups it has become even more important to speed up the actuation of the vacuum power cylinder for actuating the brakes on the trailer so as to compensate for the physical effort affecting the tractor brakes before full power operation is obtained. Accordingly it will be clearly understood that some method for balancing the power application is of vital importance.

Referring now to Figure 3, it may be seen that as shown, the valve 73 includes a casing 115 formed of sections 116 and 117. The casing 115 is formed with a port 118 at its rearward end adapted to be connected to the control pipe 74 leading to the trailer. The forward end of the casing is closed by a diaphragm 119 clamped thereto by a head 120 formed of elements 121 and 122. Between the head elements 121 and 122 there is clamped a diaphragm 123 of larger area than the diaphragm 119. Thus there is formed in the valve 73 four separate chambers. Between the sections 116 and 117 there is a chamber 124 connected by the air cleaner port 125 with the atmosphere; between the section 116 and the diaphragm 119 there is a chamber 126; between the diaphragms 119 and 123 there is a chamber 127; and between the diaphragm 123 and the element 122, there is a chamber 128.

The chamber 126 is at all times connected through the port 118 with the pipe 74 and is at times connected through a port 129 to a short pipe 130 connected to the pipe 61 and then through the pipe 60 with the source of vacuum. The chamber 127 is constantly connected by a small opening 132 with the port 129 and is therefore constantly maintained under vacuum. The chamber 128 is connected by a port 133 with the pipe 72 and is thus the control chamber for the valve.

The port 118 is formed with extensions 134 and 134ª which extend inward within the casing section 116 and are formed with guide openings for the stems 135 and 136 of valves 137 and 138. The valve 137 is arranged to close an opening 139 formed in section 116 at times, and is arranged at other times to uncover said opening to connect the chambers 124 and 126. The valve 138 is arranged at times to close an opening 140 leading to the port 129, but when the brakes are released, the valve 138 is intended to remain as shown with the opening 140 and the connection between the chamber 126 and the port 129 open. The valve stems 135 and 136 are connected to each other by a floating triangular lever 142, having pins extending into notches formed in the pins. A spring 143 acting on the stem 135 tends to move the valves to the positions shown in which the source of vacuum is connected to the chamber 126 and thence to the controlled pipe 74. The proportions of the triangular lever 142 multiply the force of the diaphragms acting to open and control the valves 137 and 138.

The triangular lever 142 is also connected by another pin to a three piece control rod or stem 144 which is clamped to the diaphragms 119 and 123. The forward end of the stem 144 extends forward into a casing 145 and at its end is provided with nuts 146. When the stem 144 is moved rearward in the action of the valve, the nuts 146 may contact a spring 147 to modify the action of the valve. Adjustment may be made of the nuts 146 on the stem 144 to vary the action of the valve in accordance with the peculiar operation of the individual tractor-trailer combination.

Operation—Synchronizer valve

Inasmuch as the area of the diaphragm 123 is larger (approximately twice as large in some installations) than the area of the diaphragm 119, variations of pressure in 128 are magnified in 126. So long as the tractor brakes are released, the chambers 126 and 128 are (as may be readily seen) connected to vacuum. Thus the three chambers 126, 127, and 128 are all connected to vacuum and the pressures on both sides of each of the diaphragms 119 and 123 are equalized. The spring 143 is then effective to hold the valve 137 in the closed position. Inasmuch as the diaphragms are formed in the shape shown in Figure 3, they move the other parts to the position shown therein. However, when the tractor brakes are actuated, atmospheric air enters the front of the cylinder 40 and also the pipe 72 and thus enters the chamber 128 through the port 133. Acting on the large area of the diaphragm 123 it moves the diaphragm and the control stem 144 first to close the valve 138 (the lapped position) and then to open the valve 137. This allows air under atmospheric pressure to enter the chamber 126 and to flow through the port 118 into the pipe 74. Atmospheric air continues to flow in until the pressure in the chamber 126 acting on the relatively small area of diaphragm 119 plus the relatively low pressure acting in the chamber 127 on the large diaphragm 123 balances the controlling pressure acting from the chamber 128 on the relatively large diaphragm 123 plus the relatively low pressure in 127 acting on the relatively small area of the diaphragm 119. Thus it will be seen that slight increases in pressure in chamber 128 will be magnified as increases in pressure in chamber 126.

If on the other hand it is desired to slow down the action of the trailer power cylinder, all that is necessary is to take up on the adjustment nuts 146.

No matter which of the valves 137 or 138 is closed at any time, the vacuum aids in holding it closed and maintaining the seal.

*Relay valve*

The relay valve 106 of Figure 4 is quite similar to the synchronizer valve of Figure 3 except that only one diaphragm is used. The various elements of the valve 106 are designated by similar numerals to those used in describing the valve 73 but with the addition of the letter "a". It is believed that the full description need not be repeated. Inasmuch, however, as there is provided only the one diaphragm 119ª, the pressures on opposite sides of the diaphragm will be always equalized because otherwise the diaphragm 119ª will move the stem 144ª to open one or the other of the valves 137ª and 138ª to equalize the pressures. The port 118ª is connected to the pipe 105, the port 125ª to the air cleaner, the port 129ª to the pipe 108 and the port 133ª to the pipe 110 which is connected by the coupling 112 and the flexible tube 114 to the pipe 74. Thus the synchronizer valve 73 controlling the pressure in the pipe 74, through the relay valve 106, controls pressure in the pipe 105 and insures that the cylinder 84 will have greater differentials of pressure than the cylinder 40 to balance out the effects of the reactionary hookup on the tractor or other differences in pressure.

*Check valve*

Although any standard check valve may be used in place of the valve 64, I prefer to use the specific valve 64 which is shown in detail in Figure 5. By reason of its design and arrangement it holds a tight seal and prevents leakage even though the differences in pressure are very small. However, it is designed to open quickly whenever the pressure in the upper end (manifold side) of the valve drops below that of the lower (cylinder side) of the valve.

The valve comprises an upper casing 146 and a lower casing 147 secured together by screws such as 148 and by a cover plate 149 which plate is secured to the upper and lower casings as by screws 150. The lower casing is formed with a valve seat 152 on which the valve plate 153 is adapted to seat. The valve plate 153 is carried by a valve stem 154 which extends freely through guides 155 and 156 formed with the upper and lower casings respectively. The upper end of the valve stem 154 is pivotally connected to one end of a bell crank lever 157 pivoted as at 159 on the upper casing 146 and having its opposite end pivotally connected as at 158 to a diaphragm 160 clamped between the cap 149 and the casings 146 and 147. The valve plate 153 is provided with an annular sealing ring 163 which coacts with the seat 152 to seal the valve. The upper casing is provided with a port 164 connected to the manifold side of the pipe 60 and the lower casing is provided with a port 165 connected to the cylinder side of the pipe 60. A chamber 167 formed between the cap 149 and the diaphragm 160 is connected to the port 165 by a small port 169.

It may be seen that whenever the pressure of the manifold side of the pipe 60 (by reason of variations in vacuum in the intake manifold) increases so that its pressure is higher than that of the cylinder side, the pressure on opposite sides of the diaphragm 160 is unbalanced and the valve 153 is quickly moved to closed position. Whenever the pressure in the upper end (manifold end) decreases to a pressure equal to the pressure at the lower end (cylinder end) the valve opens to the position shown.

Thus it will be seen that depression of the pedal 28 admits air in front of the piston 45 to apply the tractor brakes, and at the same time causes the synchronizer valve 120 to be operated to connect the line 74 to the vacuum line 61. This causes immediate operation of the relay valve 106 to disconnect the rear end of the cylinder 84 from the vacuum line 108 and connect it to atmosphere, thereby actuating the brake shaft 92.

When the brake pedal is released, the valve 58 is actuated to shut off the atmosphere from the front end of cylinder 40, and to open a communication through the piston 45 between the opposite ends of cylinder 40. This at once actuates the synchronizer valve 73 to close the connection from the vacuum line 61 and open the port leading to the atmosphere, thus admitting atmospheric pressure to the relay valve 106. The relay valve then operates to close the port leading to the atmosphere and to open the port connecting the vacuum line 108 to the rear end of the cylinder 84. Thus both tractor and trailer brakes are immediately released by their various return springs.

*External valve hookup*

Referring now to the hookup shown in Figure 6, it may be seen that the hookup is in many respects similar to that shown in Figure 1. Like parts have therefore been indicated by the same numerals with the addition of 200 and need not be again described in detail. In this arrangement, however, the brakes of the tractor are operated through a mechanical hookup actuated by a vacuum balanced power cylinder which is controlled by an external valve suspended in the pedal link. The brakes of the trailer are mechanically operated by a vacuum balanced power cylinder controlled by a synchronizer valve on the tractor and a relay valve on the trailer.

The piston rod 244 of the power cylinder 240 extends through the rear head of the cylinder 240 and is pivotally connected to a lever 246 keyed on a rock shaft 248 suitably mounted on the frame 210 and connected as at 250 to the brakes 218 associated with the rear wheels of the tractor.

The foot pedal 228 is mounted on the housing of the clutch 224.

A rod 252 connects the foot pedal lever 228 to the stem of a valve 254 and the housing of this valve is connected by a rod 256 to a lever 258 keyed to the rock shaft 248 so that the brakes 218 may be manually applied if the power fails.

A pipe 260 connected to the intake manifold 222 extends longitudinally of the frame to and slightly beyond the rear cross bar of the frame where it is provided with a suitable coupling and cut-off valve 262.

The pipe 260 has a branch 266 connected as by a flexible tubular section 268 to the valve 254. A flexible tube 270 connects the valve 254 to a pipe 272 connected as by a flexible tube 275 with the rear end of the cylinder 240. The pipe 260 also has coupled therein a T 276 connected by a flexible tube 278 to a port in the forward end of the power cylinder 240.

Thus it may be seen that operation of the foot pedal 228 moves the piston of the valve 254. This cuts off vacuum from the rear end of the cylinder 240 and allows air under atmospheric pressure to enter said rear end. The front end of the cylinder being always connected to vacuum, the entrance of atmospheric air at the rear end of the cylinder forces the cylinder piston forward to rotate the cross shaft 248 and apply the brakes 218.

The vacuum pipe 266 is connected as by a branch pipe 308 with the vacuum port of the synchronizer valve 273. The control port of the valve 273 is connected by a branch pipe 309 with the pipe 272 and the controlled port of the valve 273 (corresponding to the port 116 of valve 73) is connected to a pipe 214 which extends longitudinally of the frame to and beyond the rear cross bar of the frame where it is provided with a coupling cut-off valve 275.

Thus while the arrangement of Figure 1 discloses a tractor-trailer arrangement in which brakes are operated hydraulically and the cylinder of the tractor is operated by an internal valve through a pedal hookup which provides reaction or "feel." In the arrangement shown in Figure 6, the brakes are operated mechanically and the power cylinder on the tractor is operated by an external valve suspended in its pedal linkage which does not provide reaction. In both cases both tractor and trailer power cylinders are vacuum suspended in release, both use puller type cylinders, and in both cases the synchronizer valve is mounted on the tractor while a relay valve is mounted on the trailer.

The operation in applying and releasing the brakes differs from that described above for Figure 1 in that the actuation of the valve 254 causes the piston of the power unit 240 to rock the shaft 248 to apply the tractor brakes mechanically, while at the same time the change in the pressures in the cylinder causes the synchronizer valve to cause the relay valve 306 to admit air to the rear end of the cylinder 284 to apply the trailer brakes mechanically.

Air suspended hookup

In the arrangement shown in Figures 7 and 7a both of the power cylinders are suspended in atmosphere in release (i. e. in release the cylinder is connected to atmosphere on both sides of the piston), the tractor brakes are operated hydraulically by a pusher type power cylinder which is controlled by an internal valve operated by a reactionary linkage. The synchronizer valve is mounted on the tractor and a relay valve is mounted on the trailer.

The same numerals as used in connection with Figure 1 are used with the addition 400 to indicate like parts. The vacuum pipe 460 is, however, connected to the valve 458 by a flexible tube 459 instead of being connected to the rear of the cylinder 440. The forward end of the cylinder is provided with an air cleaner 463 so that said forward end is always connected to the atmosphere. With the pedal 428 retracted to release the brakes, the valve 458 connects the rear end of the cylinder also to atmosphere and the cylinder piston is submerged in atmosphere. However, when the pedal is moved to operate the valve 458, the communication between the rear end of the cylinder and atmosphere is cut off and the rear of the cylinder is connected to vacuum. The differential in pressures operates the cylinder piston and thus operates the piston rod 444, the power lever 446, the master cylinder piston rod 450, and the brakes.

The pipe 472 for controlling the synchronizer valve 473 is connected to the rear end of the cylinder 440 and inasmuch as the valve 473 is provided with a vacuum connection through a branch pipe 530 connected to the vacuum pipe 461 and with an air cleaner connection 525 to atmosphere, it controls the pressure in the controlled pipe 474 leading to the trailer to correspond to the pressure in the pipe 472. However, because of the differences in area of the valve diaphragms, degree of vacuum in the controlled pipe 474 is increased more rapidly than the vacuum in the pipe 472.

The brakes 438 of the trailer are operated through a cross shaft 492 operated by the air suspended power cylinder 484.

The cylinder 484 is controlled by a relay valve 506 having a controlling line 510 connected by a flexible tube 514 with pipe 474. The relay valve 506 is connected to vacuum through a short pipe 508, a reserve vacuum tank 509, a second short pipe 496 and a flexible tube 500 connected to the pipe 461. Interposed in the pipe 496 is a check valve 497.

In this case, depression of the pedal actuates the valve 458 to cut off the rear side of the cylinder 440 from the atmosphere and to connect it to the vacuum line 460, thereby rocking the lever 446 to apply pressure to the master cylinder 451 to operate the tractor brakes, and at the same time to reduce the pressure in line 472 to operate the synchronizer valve 473 to connect the vacuum line 530 with the line 474 leading to the relay valve 506. The relay valve is thereby operated to disconnect the front end of the cylinder 484 from the atmosphere and to connect it through the line 508 to the vacuum reservoir 509, thereby causing the power unit 484 to rock the shaft 492 to apply the trailer brakes mechanically.

On release of the pedal, valve 458 disconnects the rear end of cylinder 440 from the vacuum line 460 and connects it to the atmosphere; this admits air to the line 472, causing the synchronizer valve 473 to disconnect the line 474 from the vacuum line 530 and to connect it to atmosphere. This raises the pressure in line 474 to atmospheric pressure, causing the relay valve 506 to disconnect the front end of the cylinder 484 from the vacuum line 508 and to connect it to atmosphere. The various brakes are thereupon all released by their various return springs.

Synchronizer on trailer

In Figure 8, there are also shown air suspended cylinders on both tractor and trailer. The tractor brakes are operated mechanically by a puller type power cylinder controlled by an external valve interposed in the pedal connection. The synchronizer valve is mounted on the trailer.

Ports which are the same as similar ports in Figure 7 are designated by the same numerals with the addition of 200. The pedal 628 is mounted on the clutch housing 624 which is interposed between the engine 620 and the transmission 626. The pedal 628 is connected by a pedal rod 652 with the plunger of a suspended valve, the casing of which is connected by a rod 656 with a lever 658 secured to the cross shaft 648, arranged to operate the brakes 618 by operating members 650. The air suspended cylinder 640 has a piston having a piston rod 644 connected to a lever 646 secured to the cross shaft 648. The front of the cylinder 640 is pivoted as at 642 to the frame.

The valve 654 is connected to the vacuum line 606 by a branch conduit 666 and a flexible tube 668. The valve 654 has also connected thereto a conduit 670 with a branch 672 leading to the forward end of the cylinder 640. The conduit 670 extends rearwardly to a cut-off valve 674, at the rear end of the tractor which valve is connected by a flexible hose 714 to a conduit 712 on the trailer. The conduit 712 controls a synchronizer valve 673 secured to the front end of vacuum power cylinder 684. The main vacuum line 660 extends rearwardly to a cut-off valve 662 by which it is connected to a flexible hose 704 in turn connected to conduit 702 on the trailer. The conduit 702 is provided with a check valve 700 and is connected to a reserve vacuum tank 701. The tank is connected to the synchronizer valve 673 by a pipe 703 so as to supply a constant source of vacuum through the synchronizer valve for the cylinder 684.

The operation of this system is the same as that of Figure 6 except that, the synchronizer valve 673 being mounted right at the cylinder 684 on the trailer, no separate relay valve is needed.

Alternative reaction hookup

In the arrangement shown in Figures 9 and 9ª, there are provided vacuum suspended cylinders on both trailer and tractor. The brakes on the tractor are operated mechanically by a pusher type cylinder controlled by an internal valve operated by a reaction linkage and the trailer brakes are controlled by a pair of synchronizer valves mounted in series, one on the tractor and one on the trailer.

The frame 810 of the tractor is supported on a front axle 812 and a rear axle 814, the axles being supported on road wheels 816 of which the two rear wheels are provided with brakes 818. The brakes 818 are operated by a cross shaft 848, in turn operated by a rod 856 connected to the power lever 846 (see Figure 9ª) of the reactionary hookup.

The power lever is pivoted as at 847 on the pedal lever 828 which is pivoted at 852. The lower end of the power lever 846 is connected to the piston rod 844 of the cylinder 840, and the lower end of the pedal lever 828 is connected to the valve rod 857.

The intake manifold 822 of the engine 820 has connected thereto a main vacuum pipe 860 from which a branch pipe 861 leads to rear of the cylinder 840. The valve controlled by the rod 857 in released position of the pedal connects the front and rear of the cylinder 840, but when actuated allows air under atmospheric pressure to enter the front of the cylinder, thus exerting a pushing force on the piston and operating the reaction linkage and the brakes.

The forward end of the cylinder 840 has connected thereto a control pipe 872 leading to a hand valve 850 which is also connected to a conduit 851 connected to the control chamber of the synchronizer valve 873. The valve 873 is connected to the main vacuum line by a branch pipe 863 and is provided with an air cleaner 825 connected to the atmosphere. It controls the pressure in the conduit 872 connected by flexible conduit 914 with control conduit 910 mounted on the trailer and connected with synchronizer valve 906 which controls the trailer power cylinder 894. It should be here noted that the valve 850 is arranged in its normal position to connect the pipes 872 and 851. When the handle is turned, however, it closes the conduit 872 and opens the conduit 851 to atmosphere. It thus serves as a hand control for the synchronizer valve 873 so that if desired the trailer brakes may be applied by power without application of the tractor brakes.

The trailer cylinder 894 is pivotally mounted as at 886 on the frame 830 of the trailer. Its piston is connected by a rod 888 with a cross shaft 892. The cross shaft operates the brakes 838 on the rear wheels 836. The front and rear wheels 836 support respectively the axles 832 and 834 which in turn support the frame 830 of the trailer.

The main vacuum line 814 is connected by a flexible conduit 900 with a vacuum pipe 896 connected to the synchronizer valve 906 and by a branch conduit 908 connected to the front of the cylinder 894. The rear of the cylinder 894 is connected by a short conduit 905 with the synchronizer valve 906.

The operation is substantially the same as in the system of Figure 1, except that the tractor brakes are applied mechanically by rocking the shaft 848, through the medium of applying tension to the brake rod 856 by rocking the lever 846.

Alternative synchronizer valve

In Figure 10, I have shown an alternate form of synchronizer valve 907. This valve 907 may be substituted at any place in the systems described above where a synchronizer valve is called for, although I prefer the form shown in Figure 3.

As shown, the synchronizer valve 907 includes a cylinder 916 formed generally open at one of its ends and generally closed at its other end. The open end has a cup-shaped flange 918, and the closed end has a head 920 which is provided with a port 922 adapted to be connected to a port in one end of a power cylinder. The cylinder 916 has spaced slots or grooves 924, 926 and 928. The groove 924 communicates with a port 930 adapted to be connected to a port in the other end of the power cylinder; the groove 928 communicates with a port 934 connected to atmosphere by a suitable air filter 936.

A piston 938 reciprocable in the cylinder 916 is sealed against leakage by the packing 932 in the groove 926 in the wall of the cylinder. The piston has an axial double diametral chamber 940 opening into the cylinder. This double diametral chamber has an annular shoulder at the junction of the large and small sections of the chamber, and a spring 942 seated on the head 920 is adapted to cooperate with the annular shoulder to retard movement of the piston 938 to the left as shown in Figure 10. That portion of the chamber 940 having the smaller diameter has a plurality of ports 944 communicating with a circumferential groove 946 in the wall of the piston adapted at times to register with the port 934. The chamber 940 also has a port 948 adjacent the closed end of the chamber.

The piston 938 has a concentric extension 950. A disk 952 sleeved on the extension 950 supports an annular flexible diaphragm 954 having its rim seated on the cup-shaped flange 918. This diaphragm provides in conjunction with the flange 918 a chamber 947 communicating with the double diametral chamber 940 by way of the port 948 and also by way of the ports 944 when the valve is in its normal position. A disk 958 sleeved on the extension 950 bears against the other side of the diaphragm, and a sleeve 960 threaded on the extension serves to clamp the diaphragm between the disks 952 and 958.

A frustro conical housing 962 has on one of its ends a flange 964 seated on the rim of the diaphragm 954 and secured to the flange 918 as by screws 966. The other end of this housing 962 has a flange 968 supporting the rim of a flexible diaphragm 970 centrally clamped between the disks 972 and 974 by a pin 976 passing axially through the diaphragm and disks and threaded in the sleeve 960. The diaphragm 970 has a greater diameter than the diaphragm 954 and provides in conjunction with the diaphragm 954 and the housing 962 a chamber 978 provided with a port 980 adapted to be connected to port 930 as by a branch conduit 981.

A dome-shaped cover 982 has a marginal flange 984 seated on the rim of the diaphragm 970 and secured to the flange 968 as by bolts 986 so as to secure the diaphragm against displacement. This cover 982 provides in conjunction with the diaphragm 970 a chamber 988 provided with a port 990 adapted to be connected to the control line on the trailer. The cover 982 has an axial opening in which is suitably secured a sleeve 992 through which the pin 976 extends. A spring 994 sleeved on the pin 976 is seated on a shoulder in the sleeve, and nuts 996 threaded on the sleeve cooperate with the spring in resisting movement of the piston to the left in instances where it may be desired to retard the action of the power cylinder. A thimble 998 threaded on the sleeve 992 houses the pin 976 and the spring 994 and also seals the chamber 988 against leakage.

The synchronizer valves 73 and 907 are provided, as stated, so that the brakes of the tractor and the brakes of the trailer may be synchronized. The valve 907, for example, is operative to maintain the maximum vacuum in the chamber 978 at all times by means of a connection from the port 980 to the main vacuum line, so as to balance the maximum vacuum in the chambers 940, 947, and 988 when at rest. Under this condition, when atmospheric air is admitted to the chamber 988 through its connection to the control line, the pressure on the diaphragm 970 will move the piston 938 so that the ports 944 and groove 946 register with the port 934, thereby admitting atmosphere to the chamber 947 by the ports 948 and to the power cylinder by way of the double diametral chamber 940, the cylinder 916 and the port 922.

Since the diaphragm 954 is smaller than the diaphragm 970, it requires that a higher pressure be provided in 947 than the pressure in 988 to balance the pressure already created on the diaphragm 970. Accordingly, the braking pressure in the rear of the connected power cylinder will be greater than the pressure in the chamber 988 and in the pipe line connecting the synchronizer valve 907 to the controlling brake valve, and because of this the power is applied more rapidly to the power cylinder on the trailer than it would be otherwise.

In instances where it is desired to retard or accelerate the action of the power cylinder of the trailer, the nuts 996 on the pin 976 may be adjusted so as to cooperate with the spring 994 in resisting movement of the piston 938 to produce the desired result.

Relay conversion valve

Referring to Figures 11 to 17 inclusive, it may be seen that the relay valve 1020 comprises essentially a pair of casings 1022 and 1024 secured together by bolts such as 1026. Clamped between these casings by the bolts 1026 is a diaphragm 1028 to which there is secured as by means of the bolt 1030, a tubular valve member 1034 which is slidable in the casing member 1022. The casing member is formed with an end port 1036 arranged to be connected with the cylinder controlled by the valve, with a side port 1038 arranged to be connected with the source of vacuum (normally the intake manifold) and with a port 1040 arranged to be connected with the atmosphere. Threaded into the port 1040 is an air cleaner 1042 provided for the purpose of preventing foreign matter from being drawn into the intake manifold. As shown in Figure 11, the tubular valve member 1034 in the released position of the brakes is normally retracted toward the right by the diaphragm 1028 so that the port 1038 is uncovered and there is communication between the vacuum port 1038 and the cylinder port 1036. Thus the cylinder is connected to the source of suction. When, however, the valve member 1034 is moved to the left from the position shown in Figure 11 to the position shown in Figure 18, by reduced pressures from port 1038 acting through the interior of sleeve 1034 and through passages 1044 on the diaphragm 1028, and by the plunger 1046 as described below, the port 1038 is closed by the end of the valve member and the connection between the intake manifold and the cylinder is cut off. Further movement of the tubular member 1034 to the left beyond the positions shown in Figures 11 and 18, moves an opening 1044 in the tubular member 1034 into registration with the port 1040 and thus allows atmospheric air to enter through the air cleaner 1042, the port 1040, the opening 1044 and the interior of the valve to the cylinder port 1036, thus allowing atmospheric air to enter the power cylinder to apply the brake.

The diaphragm 1028 is controlled at least partially by differentials in pressure on the opposite sides thereof and at times partially by a plunger 1046 which is positioned in the casing 1024. The plunger 1046 normally bears at one end on a plate 1048 secured to the diaphragm 1028 by the bolt 1030. The plunger 1046 is itself controlled partially by a spring 1050 bearing at one end on the exterior of the casing 1024 and at the other end on a plate 1052 secured to the end of an extension rod 1054. The rod 1054 is secured at its inner end to the plunger 1046 and at its outer end has a nut 1056 by which the tension of the spring 1050 may be varied. A cover cap 1058 is provided to eliminate as far as possible undesired adjustment of the spring tension. The casing 1022 is formed adjacent to its inner end to provide a chamber 1060 just to the left of the diaphragm 1028 and the casing 1024 is similarly formed to provide a chamber 1062 just to the right of the diaphragm 1028 and to provide a chamber 1064 formed just to the right of the plunger 1046. Thus the movement of the diaphragm 1028 is controlled and thereby the movement of the slidable valve element 1034 is also controlled. The chamber 1060 is connected at all times with the port 1036 and is thus connected with the power cylinder so that the pressure in the chamber 1060 is the same as that existing in the power cylinder at all times. In the position of the control valve shown in Figures 12, 13, 14 and 15, the chamber 1062 is connected with a control line connected with the power cylinder of the tractor vehicle. This is the position of the control valve used when both the trailer and the tractor vehicle brakes are operated by vacuum power cylinders of the vacuum suspended type. The chamber 1062 has leading therefrom a passageway 1066. The passageway 1066 is (as shown most clearly in Figures 13 and 14) arranged to register with a bore 1068 extending inward to the center of the rotatable plug valve 1070 and there communicating with a diametral bore 1072 also formed in said plug valve. The bore 1072 communicates by means of a slot 1074 (see Figures 13, 15 and 17) with a port 1076 connected to the control line. The diaphragm 1062 is normally urged toward the right by a light spring 1078 shown most clearly in Figure 11.

*Operation*

Thus normally the diaphragm 1028 and the sliding element 1034 are held toward the right (as shown) so that the cylinder outlet 1036 communicates with the vacuum outlet 1038. However, as soon as a greater pressure is developed in the control line this greater pressure moves the diaphragm 1028 to the left, thus closing the port 1038 and on continued movement to the left causes the port 1040 to register with the port 1044, thus allowing atmospheric air to flow in the air cleaner 1042 and develop substantially an equal higher pressure in the valve casing 1022 and in the cylinder controlled thereby. It is to be understood that the development of higher pressure in the control line is itself caused by allowing atmospheric air to flow into the power cylinder on the tractor vehicle and apply the brakes thereof, and it is also to be understood that during the operation described the plunger 1046 is held in the position shown in Figure 11 by the spring 1050.

However, when the tractor vehicle is controlled by superatmospheric pressure air brakes, a different setting of the valve 1070 is necessary. Thereupon the valve 1070 is rotated by means of the lug 1080 (shown best in Figures 12 and 13) through 90° so that the bores 1068 and 1072 assume the position shown in Figure 16. Thereupon the bore 1072 connects the passageway 1066 with an opening 1082 connected to the same suction line as is the inlet 1038. It may thus be seen that the pressures in the chamber 1060 and the chamber 1062 remain equalized so long as the inlet 1038 communicates with the interior of the valve and therefore the valve remains in the position shown until urged therefrom by some additional force. The rotation of the valve 1070 also causes a bore 1084 (see Figure 17) also formed in the plug 1070 but spaced longitudinally of the plug from the bore 1072 to register with the opening 1076 and with a port 1086 connected with the chamber 1064. Thus the control line which is connected with the opening 1076 is connected with the chamber 1064 and as the power cylinder on the tractor is operated by compressed air the compressed air entering the chamber 1064 moves the plunger 1046 to the left moving also the valve element 1034 and allowing atmospheric air to flow into the trailer power cylinder. The amount of air which is allowed to flow into the trailer cylinder depends partially on the pressure in the control line and partially by the strength of the spring 1050. The strength of the spring may be adjusted by the nut 1056. As atmospheric air flows into the casing 1022, the pressure therein is increased and acts on the diaphragm to oppose the pressure in the control line until the valve is lapped as in Figure 18. Therefore, the brakes on the tractor are synchronized with the brakes on the trailer. It may be noted from Figure 15 that with the plug valve 1070 in the position shown in Figures 13, 14 and 15 the control line is cut off from the chamber 1064 but connected to chamber 1062. In the position shown in Figures 16 and 17, the control line is cut off from chamber 1062 but connected to chamber 1064.

*Conversion valve installations*

In Figures 19, 20 and 21, I have shown applications of my improved valve 1020 to tractor and trailer installations. Thus in Figure 19 there is shown a portion 1101 of a tractor vehicle connected by a long extension pole 1103 with a trailer 1105 having brakes 1107. The brakes are operated by a lever 1109 which is connected through a tension link 1111 with an idler lever 1113 on the end of which is mounted a pulley 1115. Extending around the pulley is a cable 1117 having one end secured to a drum 1118 arranged to be rotated by a hand lever 1119 and normally held secured in position by a ratchet 1121. The other end of the cable 1117 is connected to a piston rod 1123 of a piston 1125 positioned in a vacuum suspended power cylinder 1127. The cylinder 1127 has an inlet conduit 1129 connected to the forward end thereof and an inlet conduit 1131 connected to the rear end thereof. The conduit 1131 connects the cylinder 1127 to the port 1036 of a valve 1020 and a vacuum line 1133 is connected to the conduit 1129 and to the ports 1038 and 1082 of the valve 1020. A control line 1135 is connected to the port 1076 of the valve 1020.

It is to be noted also that the trailer brakes may if desired be set by hand by rotating the drum 1118 by the hand lever 1119. Thus this hand lever 1119 may serve as a parking lever for the trailer.

Figure 20 shows a complete tractor and trailer arrangement. Therein I have used the same numerals as used in Figure 19 with the addition of 100 to indicate similar parts. The tractor 1201 is provided with an internal combustion engine 1237 of which the intake manifold 1239 is connected by a conduit 1241 with a flexible hose 1243, in turn connected with the vacuum line 1233. Intermediate the conduit 1241 there is provided a check valve 1245 to prevent variations in the intake manifold from affecting the vacuum developed in the power cylinder 1227. The brakes 1247 of the tractor vehicle are operated by means of a cross shaft 1249 which is in turn normally operated through a link 1251 by a power cylinder 1253. The power cylinder is controlled by a valve 1255 which is operated by a pedal 1257 and which is arranged to connect a conduit 1259a leading to a compressed air tank 1259 with a conduit 1261 leading to the power cylinder 1253. As may be seen, the conduit 1261 is also connected to a conduit 1263 which is coupled by a resilient hose 1265 with the control line 1235. Air under pressure is maintained in the tank 1259 by means of an air pump 1267 connected with the tank by means of a conduit 1269.

In Figure 21 is shown a complete tractor and trailer combination in which the brakes on the tractor vehicle are operated by a vacuum power system of the vacuum suspended type. Like parts are designated by the same numerals as Figure 20 with the addition of 100. It may be noted, however, that in this installation no compressed air tank is needed but the vacuum conduit 1341 is not only connected to the trailer power operator but is also connected to the front of the cylinder 1353 by means of a conduit 1371 and to the valve 1355 by a conduit 1373.

Control valve

The valve 1355 is shown more clearly in Figure 22 wherein it may be seen that it comprises a pair of casings 1375 and 1377 secured to each other as by screws 1379 and having clamped between the sections a diaphragm 1381. To the center of the diaphragm 1381 there is secured a slidable member 1383 having a tapped bore 1385 formed therein into which is threaded the pedal rod 1358 connected with the pedal 1357. The diaphragm is formed with openings such as 1387 and the slidable member 1385 is provided with a plate member 1389 so constructed that when it is drawn into contact with the diaphragm it covers the openings 1387. The casing 1377 is provided with an inlet opening 1391 which is connected to the conduit 1361 and also with an opening 1393 connected with the conduit 1373. Air may enter the valve through the air cleaner 1395 and the openings 1397. The element 1375 is also provided with a tapped bore 1399 in which there is threaded a rod 1390 connected to operate the cross shaft 1349.

Control valve operation

It may be thus seen that operation of the pedal 1357 through the pedal rod 1358 is arranged to move first the plate member 1389 to the left allowing the diaphragm to seat to cut off the vacuum connection. Subsequent movement of the pedal moves the plate member 1389 from contact with the diaphragm and allows atmospheric air to enter through the air cleaner 1395, the ports 1397 and the openings 1387. The atmospheric air dumped into the rear of the cylinder 1353 then normally acts on the piston therein to urge the piston forward and through the piston rod 1351 to rotate the cross shaft 1349 to apply the brakes. In the event that there is a failure of the vacuum power, the nut on the slidable member 1383 contacts the casing element 1377 and direct manual force is thus exerted on the rod 1390 to rotate the cross shaft manually.

Check valve

The check valve 1245 is shown in Figure 23 and merely comprises a casing 1292 having an opening 1294 connected toward the intake manifold 1239 and an opening 1296 connected toward the conduit 1241. The casing 1292 is provided with a plunger 1298 so arranged that whenever the pressure in the opening 1296 is greater than the pressure in the opening 1294 the plunger moves from its seat toward the intake manifold, but whenever the pressure conditions are reversed the plunger 1298 seats to prevent the reverse passage of air.

Conversion system operation

It is believed that the operation of my improved valve 1020 in the various systems disclosed will be clear from the above description. When the brakes on the tractor vehicle are applied by compressed air as in Figure 20, operation of the pedal 1257 allows the compressed air to pass through the conduit 1259a through the valve 1255 and the conduit 1261 to the rear of the cylinder 1253 to exert force on the rod 1251 and operate the cross shaft 1249 to apply the brakes of the tractor vehicle. This air under superatmospheric pressure is also allowed to pass through the conduit 1263, the flexible conduit 1265, the conduit 1235 and entering the control valve 1020 through the port 1076 passes through the bore 1084 to the chamber 1064. There it acts on the plunger 1046 to move the diaphragm 1028 to the left and moving also the slidable element 1034 allows atmospheric air to pass in through the air cleaner 1042 and the aligned ports 1040 and 1044, thence out through the port 1036 and the conduit 1231 into the cylinder 1227. Inasmuch as the front of the cylinder 1227 is connected through the conduit 1233 with the source of suction, the atmospheric air acting on the rear face of the piston in cylinder 1227 creates a force on the piston which acting through the rod 1223 applies the brakes.

The pressure thus acting on the brakes through passage 1036, together with the reduced pressure in the space 1062, acts on the relatively large diaphragm 1028 in opposition to the pressure exerted in the space 1064. When these forces acting on the diaphragm 1028 balance, the valve is "lapped" by moving the valve sleeve 1034 just for enough to close the port 1040. When the brakes are released, the pressure in the space 1064 is relieved, the valve sleeve 1034 is moved by spring 1028 all the way to the right, and the port 1036 is connected to the port 1038 to reduce the pressure in the brake cylinder and permit the return springs to release the brakes.

The operation of the device in Figure 21 to apply the brakes of the tractor vehicle is similar to that explained above. The atmospheric air entering the rear of the cylinder 1353 to develop atmospheric pressure therein also develops atmospheric pressure in the conduit 1363, the coupling 1365, the control line 1335 and entering the valve 1020 through the opening 1076 passes through the slot 1074, the bores 1072 and 1068, and the passage 1066 to the chamber 1062. This atmospheric pressure in the chamber 1062 acts on the diaphragm 1028 to move the slidable element 1034 to also allow atmospheric air to enter the valve and the rear of the cylinder 1327 to apply the brakes. It is to be emphasized that in this embodiment the pressure on the brakes of the trailer vehicle must correspond to the pressure applying the brakes on the tractor vehicle, because of the fact that as soon as the pressure on the brakes in the trailer vehicle equals that in the tractor vehicle the pressure in the chamber 1060 will act on the diaphragm 1028 to move the valve element 1034 to the position shown in Figure 18 in which the power cylinder on the trailer vehicle is cut off both from the atmosphere and from the vacuum. Increase in pressure on the tractor vehicle will again open the valve to allow an increase in pressure on the trailer vehicle and decrease in pressure on the tractor vehicle will move the valve to the position shown in Figure 11 to release a part or all of the pressure on the trailer vehicle.

The operation of the brakes in the arrangement shown in Figure 19 is the same as the operation in Figure 20 where the tractor brakes are operated by compressed air.

When it is desired to adjust the length of the trailer by adjusting the telescoping pole 1103, the effective length of the cable 1117 is also adjusted to correspond by means of the drum 1117.

It is to be understood that the above-described embodiments of my invention are for the purpose of illustration only and various changes may be made therein without departing from the spirit and scope of the invention. This application is a partial continuation of application No. 94,838, filed August 7, 1936, as a joint application of myself and Henry D. Hukill and now pending as a sole application of said Hukill.

I claim:

1. For use with a system of power operated brakes for automotive vehicles comprising a vacuum suspended power brake system for a tractor vehicle and a vacuum suspended power brake system for a trailer vehicle; a valve having a movable diaphragm and a movable valve element connected thereto, the position of the connected movable elements being controlled at least partially by three pressures, one of which is the pressure of vacuum in the vacuum source, a second of which is the controlling pressure, and a third of which is the controlled pressure.

2. For use with a system of power operated brakes for automotive vehicles comprising a vacuum suspended power brake system for a tractor vehicle, a vacuum suspended power brake system for a trailer vehicle; a valve having a movable diaphragm and a movable valve element connected thereto and having a plurality of separated chambers, to one of which there is connected a source of vacuum, to another of which there is at times connected a source of air pressure higher than the pressure of said source of vacuum and to a third of which there is connected air under the pressure of said controlled pressure.

3. For use with a system of power operated brakes for automotive vehicles comprising a vacuum suspended power brake system for a tractor vehicle, a vacuum suspended power brake system for a trailer vehicle operated by air under controlled pressure; a valve having a movable diaphragm and a movable valve element connected thereto and having a plurality of separated chambers, to one of which there is connected a source of vacuum, to another of which there is at times connected a source of air pressure higher than the pressure of said source of vacuum and to a third of which there is connected air under the pressure of said controlled pressure.

4. For use with a system of power operated brakes for automotive vehicles comprising a vacuum suspended power brake system for a tractor vehicle and a vacuum suspended power brake system for a trailer vehicle; a valve having a movable diaphragm and a movable valve element connected thereto, the position of the connected movable elements being controlled at least partially by three pressures, one of which is the pressure of vacuum in the vacuum source, a second of which is the controlling pressure, and a third of which is the controlled pressure, the controlled pressure bearing a definite relation to but differing at times from the controlling pressure.

5. For use with a system of power operated brakes for automotive vehicles comprising a vacuum suspended power brake system for a tractor vehicle, and a vacuum suspended power brake system for a trailer vehicle; a valve having a movable diaphragm and a movable valve element connected thereto, the valve being provided with two chambers separated from each other by said diaphragm, one of said chambers being connected to the source of vacuum and the other being connected to a source of pressure from the tractor vehicle by which said valve is controlled.

6. For use with a system of power operated brakes for automotive vehicles comprising a vacuum suspended power brake system for a tractor vehicle, and a vacuum suspended power brake system for a trailer vehicle; a valve having a movable diaphragm and a movable hollow plunger arranged to alternatively open and close a port leading to a source of vacuum and a port leading to atmosphere connected thereto, the valve being provided with two chambers separated from each other by said diaphragm, one of said chambers being connected to the source of vacuum and the other being connected to a source of pressure from the tractor vehicle by which said valve is controlled.

7. For use with a system of power operated brakes for automotive vehicles comprising a vacuum suspended power brake system for a tractor vehicle, and a vacuum suspended power brake system for a trailer vehicle; a pressure responsive valve element, a pressure controlling valve element, an adjustable spring pressure device acting on one of said valve elements.

8. For use with a system of power operated brakes for automotive vehicles comprising a vacuum suspended power brake system for a tractor vehicle, and a vacuum suspended power brake system for a trailer vehicle; a pressure responsive valve element, a pressure controlling valve element, an adjustable spring pressure device acting on one of said valve elements so arranged that the pressure responsive element is controlled by a controlling pressure whereby the controlled pressure is constrained to bear a definite relation to but differing from the controlling pressure.

9. For use with a system of power operated brakes for automotive vehicles comprising a vacuum suspended power brake system for a tractor vehicle, and a vacuum suspended power brake system for a trailer vehicle; a pressure responsive valve element, a pressure controlling valve element, a regulatable spring pressure device acting on one of said valve elements so arranged that the pressure responsive element is controlled by a controlling pressure whereby the controlled pressure is constrained to bear a definite relation to but differing from the controlling pressure.

10. For use with a system of power operated brakes for automotive vehicles comprising a vacuum suspended power brake system for a tractor vehicle and a vacuum suspended power brake system for a trailer vehicle; a valve having a movable diaphragm and a movable valve element connected thereto, the position of the connected movable elements being controlled at least partially by three pressures, one of which is the pressure of vacuum in the vacuum source, a second of which is the controlling pressure, and a third of which is the controlled pressure, the controlled pressure bearing a definite relation to but differing at times from the controlling pressure, and means for regulating said relation.

11. For use with a system of power operated brakes for automotive vehicles comprising a vacuum suspended power brake system for a tractor vehicle and a vacuum suspended power brake system for a trailer vehicle; a valve having a movable pressure responsive valve element and a pressure controlling movable valve element connected thereto, the position of the connected movable elements being controlled at least partially by three pressures, one of which is the pressure of vacuum in the vacuum source, a second of which is the controlling pressure, and a third of which is the controlled pressure.

12. For use with a system of power operated brakes for automotive vehicles comprising a vacuum suspended power brake system for a tractor vehicle, a vacuum suspended power brake system for a trailer vehicle; a valve having a movable pressure responsive valve element and a pressure controlling movable valve element connected thereto and having a plurality of separated chambers, to one of which there is connected a source of vacuum, to another of which there is at times conneced a source of vacuum, to another of which there is at times connected a source of air pressure higher than the pressure of said source of vacuum and to a third of which there is connected air under the pressure of said controlled pressure.

13. For use with a system of power operated brakes for automotive vehicles comprising a vacuum suspended power brake system for a tractor vehicle, a vacuum suspended power brake system for a trailer vehicle operated by air under controlled pressure; a valve having a movable pressure responsive valve element and a pressure controlling movable valve element connected thereto and having a plurality of separated chambers, to one of which there is connected a source of vacuum, to another of which there is at times connected a source of air pressure higher than the pressure of said source of vacuum and to a third of which there is connected air under the pressure of said controlled pressure.

14. For use with a system of power operated brakes for automotive vehicles comprising a vacuum suspended power brake system for a tractor vehicle and a vacuum suspended power brake sysem for a trailer vehicle; a valve having a movable pressure responsive valve element and a pressure controlling movable valve element connected thereto, the position of the connected movable elements being controlled at least partially by three pressures, one of which is the pressure of vacuum in the vacuum source, a second of which is the controlling pressure, and a third of which is the controlled pressure, the controlled pressure bearing a definite relation to but differing at times from the controlling pressure.

15. For use with a system of power operated brakes for automotive vehicles comprising a vacuum suspended power brake system for a tractor vehicle, and a vacuum suspended power brake system for a trailer vehicle; a valve having a pressure responsive valve element and a pressure controlling movable valve element connected thereto, the valve being provided with two chambers separated from each other by said diaphragm, one of said chambers being connected to the source of vacuum and the other being connected to a source of pressure from the tractor vehicle by which said valve is controlled.

16. For use with a system of power operated brakes for automotive vehicles comprising a vacuum suspended power brake system for a tractor vehicle, and a vacuum suspended power brake system for a trailer vehicle; a valve having a movable pressure responsive valve element and a movable hollow plunger arranged to alternatively open and close a port leading to a source of vacuum and a port leading to atmosphere connected thereto, the valve being provided with two chambers separated from each other by said diaphragm, one of said chambers being connected to the source of vacuum and the other being connected to a source of pressure from the tractor vehicle by which said valve is controlled.

17. For use with a system of power operated brakes for automotive vehicles comprising a differential air pressure power brake system for a tractor vehicle, and a differential air pressure power brake system for a trailer vehicle; a valve having a movable diaphragm and a movable valve element connected thereto, the valve being provided with two chambers separated from each other by said diaphragm, one of said chambers being connected to the source of vacuum and the other being connected to a source of pressure from the tractor vehicle by which said valve is controlled, said movable elements being controlled at least partially by three pressures, one of which is the pressure of vacuum in the vacuum source, a second of which is the controlling pressure, and a third of which is the controlled pressure.

18. For use with a system of power operated brakes for automotive vehicles comprising a differential air pressure brake system for a tractor vehicle, a differential air pressure power brake system for a trailer vehicle; a valve comprising a movable valve element, a diaphragm for controlling said movable valve elements having one side on which air under negative pressure acts, and an adjustable spring element also acting on said valve element.

19. For a brake system a valve provided with a casing, a valve element in said casing, a pressure responsive element controlling said valve element, means for exposing one side of said pressure responsive element to the pressure in said valve, means for conducting fluid pressure to the other side of said pressure responsive element, means for connecting a control line to said conducting means, and means for disconnecting said control line and connecting manifold vacuum to said conducting means, said disconnecting and connecting means comprising a casing associated with said first named casing, a rotatable plug valve element in said casing formed with a plurality of bores arranged in a plane perpendicular to the rotatable axis of said plug, a bore arranged in another plane perpendicular to said axis, and a groove on the periphery of said plug interconnecting one of said bores in the first plane with a portion of the plug in the second named plane.

20. For use with a system of power operated brakes for automotive vehicles comprising an air suspended power brake system for a tractor vehicle and an air suspended power brake system for a trailer vehicle; a valve having a movable diaphragm and a movable valve element connected thereto, the position of the connected movable elements being controlled at least partially by three pressures, one of which is the pressure of vacuum in the vacuum source, a second of which is the controlling pressure, and a third of which is the controlled pressure.

21. For use with a system of power operated brakes for automotive vehicles comprising an air suspended power brake system for a tractor vehicle, an air suspended power brake system for a trailer vehicle; a valve comprising a movable pressure responsive element, and a movable pressure controlling element connected thereto, and formed with a plurality of separated chambers to each of which a sometimes differing pressure is connected so that said differing pressures exert position controlling pressures on said movable elements, and an adjustable spring also arranged to exert positioning controlling pressure on said movable elements.

22. In a system of brakes for automotive vehicles a hydraulically actuated braking system for the tractor vehicle having the brakes applied by power by means of a differential air pressure power cylinder having a piston normally suspended in atmosphere, a brake system for the trailer vehicle having the brakes applied by power by means of a differential air pressure power cylinder having a piston normally suspended in atmosphere, and a step up control valve controlled by the differentials of pressure in the tractor power cylinder and controlling the differential pressure on the trailer vehicle so as to apply the trailer brakes with greater force than the tractor brakes but proportionately thereto, and means for varying the differences in pressure in the two systems of brakes comprising an adjustable spring.

23. A brake system for automotive vehicles comprising brakes for a tractor vehicle, brakes for a trailer vehicle, a pressure differential power cylinder mounted on the tractor vehicle for operating said tractor brakes and provided with a piston suspended in vacuum in the released position of the brakes, a pressure differential power cylinder mounted on the trailer vehicle for operating the trailer brakes and provided with a piston suspended in vacuum in the released position of the brakes, a pedal for operating the tractor brakes, means connecting said pedal to said tractor brake for operating said brakes mechanically, a valve suspended in said connecting means for controlling the pressure differentials of said tractor power cylinder, and a synchronizer valve controlled by the pressure differential of the tractor power cylinder for controlling the pressure differentials of the trailer power cylinder dependent on the tractor power cylinder differentials but arranged so that the trailer power cylinder differentials for applying the trailer brakes will be greater than the tractor power cylinder differentials.

24. A brake system for automotive vehicles comprising brakes for a tractor vehicle, brakes for a trailer vehicle, a pressure differential power cylinder mounted on the tractor vehicle, means whereby said power cylinder operates said tractor brakes comprising a wholly mechanical linkage, a pressure differential power cylinder mounted on the trailer vehicle, means whereby said power cylinder operates said trailer brakes, a synchronizer valve normally controlled by the tractor cylinder differential and controlling the trailer cylinder differential to depend thereon but so that said trailer cylinder differential varies from said tractor cylinder differential, said valve including a plurality of pressure responsive diaphragms of different areas, and a hand control valve mounted on the tractor vehicle arranged to control the synchronizer valve independently of the operation of the tractor brakes.

25. A brake system for automotive vehicles comprising a pressure differential power cylinder for operating brakes of a tractor vehicle, hydraulic transmission means through which said pressure differential power cylinder operates said brakes, a pressure differential power cylinder for operating brakes of a trailer vehicle, and a synchronizer valve on the trailer vehicle arranged to be controlled by the pressure differential of the tractor power cylinder to control the pressure differential of the trailer vehicle cylinder so that the pressure differential of the trailer vehicle is greater than the pressure differential of the tractor vehicle.

26. For use with a system of power operated brakes for automotive vehicles comprising a differential air pressure brake system for a tractor vehicle, a differential air pressure power brake system for a trailer vehicle; and a valve mounted on the tractor comprising a pair of movable poppet valve elements, a diaphragm for controlling said movable valve elements having one side on which air under negative pressure acts, and an adjustable spring element also acting on said valve element.

27. For use with a system of power operated brakes for automotive vehicles comprising an air pressure power brake system for a trailer vehicle, a differential air pressure power brake system for a tractor vehicle in which there is a proportionate reaction on the pedal and in which a valve controlling the power brakes is suspended in the linkage between the pedal and the brakes; a valve comprising a movable pressure responsive diaphragm having one side on which air under negative pressure acts, and a slidable hollow piston controlled by said diaphragm and arranged to alternatively open and close vacuum and air ports.

28. A brake system for automotive vehicles comprising brakes for a tractor vehicle, brakes for a trailer vehicle, a pressure differential power cylinder mounted on the tractor vehicle, means whereby said power cylinder operates said tractor brakes comprising a wholly mechanical linkage, a pressure differential power cylinder mounted on the trailer vehicle, means whereby said power cylinder operates said trailer brakes, a synchronizer valve normally controlled by the tractor cylinder differential and controlling the trailer cylinder differential to depend thereon but so that said trailer cylinder differential varies from said tractor cylinder differential, said valve including a plurality of pressure responsive diaphragms of different areas, and a reserve tank on the trailer connecting the trailer braking system.

ROBERT P. BREESE.